(12) United States Patent
Sweet et al.

(10) Patent No.: US 6,519,714 B1
(45) Date of Patent: Feb. 11, 2003

(54) EVALUATING COMPUTER RESOURCES

(75) Inventors: Bruce Sweet, North Reading, MA (US); Bruce A. Kelley, Jr., Westford, MA (US); Gev Daruwalla, Milford, MA (US); John Fulreader, Arlington, MA (US); Gregory Pegram, Haverhill, MA (US)

(73) Assignee: NetScout Service Level Corporation, Westford, MA (US)

( * ) Notice: Subject to any disclaimer, the term of this patent is extended or adjusted under 35 U.S.C. 154(b) by 0 days.

(21) Appl. No.: 09/409,558

(22) Filed: Sep. 30, 1999

Related U.S. Application Data
(60) Provisional application No. 60/102,579, filed on Sep. 30, 1998.

(51) Int. Cl.[7] .................................................. G06F 11/00
(52) U.S. Cl. ............................................ 714/28; 709/203
(58) Field of Search ..................................... 714/28, 37, 38, 714/43, 33, 40, 41, 32; 709/203, 207, 223, 224

(56) References Cited

U.S. PATENT DOCUMENTS

| | | | |
|---|---|---|---|
| 5,045,994 A | * 9/1991 | Belfer et al. | 364/200 |
| 5,303,166 A | * 4/1994 | Amalfitano et al. | 364/551.01 |
| 5,365,606 A | * 11/1994 | Brocker et al. | 395/650 |
| 5,577,197 A | 11/1996 | Beck | 395/183.04 |
| 5,590,315 A | * 12/1996 | Hess et al. | 395/500 |
| 5,715,433 A | * 2/1998 | Raghavan et al. | 395/500 |
| 5,732,240 A | 3/1998 | Caccavale | 395/445 |
| 5,745,692 A | * 4/1998 | Lohmann, II et al. | 395/200.53 |
| 5,751,964 A | 5/1998 | Ordanic et al. | 395/200.54 |
| 5,768,539 A | * 6/1998 | Metz et al. | 395/200.79 |
| 5,812,780 A | 9/1998 | Chen et al. | 395/200.54 |
| 5,914,713 A | * 6/1999 | Nario et al. | 345/335 |
| 5,991,806 A | * 11/1999 | McHann, Jr. | 709/224 |
| 6,038,296 A | * 3/2000 | Brunson et al. | 379/100.11 |
| 6,123,735 A | * 9/2000 | Raghavan et al. | 703/21 |
| 6,167,534 A | * 12/2000 | Straathof et al. | 714/38 |

OTHER PUBLICATIONS

Annex to PCT Communication Relating to the Results of the Partial International Search Corresponding To PCT International Application No. PCT/US99/22534; Authorized Officer: Ahmed Soliman; Date of Mailing: Feb. 11, 2000 (6 pages).

Volochine, Tania et al., 8302 IEEE Network, No. 5, Sep. 5, 1991, "Network Management and Traffic Analysis for CIC-Net", pp. 41–50.

IBM Technical Disclosure Bulletin, vol. 32, No. 9A, Feb. 1990, "Statistical Technique for Detection of Exceptional Situations in MVS Systems", pp. 25–26.

Amer, Paul D. et al., Proceedings of the Conference on Local Computer Networks, 1989, "Management of Sampled Real-Time Network Measurements", pp. 62–68.

(List continued on next page.)

Primary Examiner—Nadeem Iqbal
(74) Attorney, Agent, or Firm—Testa, Hurwitz & Thibeault, LLP.

(57) ABSTRACT

To closely simulate the experience of an end user, a software agent executes where the end user would be situated and attempts to exercise a computer resource such as a networked application or a network resource in a simulated transaction in exactly or nearly exactly the same way that the computer resource would be exercised by the end user in non-simulated transaction. The results of the simulated transaction and of other simulated transactions by other software agents are communicated to a central software system for recordation and analysis.

47 Claims, 11 Drawing Sheets

OTHER PUBLICATIONS

Orchard, Robert A., Conference Proceedings of CMG '85: International Conference on the Management and Performance of Evaluation of Computer Systems, Dec. 9–13, 1985, "A Mathematical Approach to the Management of Service Requirements", pp. 780–786.

Borella, M.S. et al., "WANDS: Wide–Area Network Delay Simulator", Proceeding of the IEEE $7^{th}$ International Workshop on Network and Operating Systems Support for Digital Audio and Video (CAT No. 97TH8259), pp. 85–92, XP002131053, 1997, New York, NY.

Larsen, A.K., "All Eyes on IP Traffic. New Apps Can Monitor Internet and Intranet Traffic, But Do They Deliver Enough Data to Hold ISPS to Their Promises?", Data Communications, McGraw Hill, New York, vol. 26, No. 4, Mar. 21, 1997, pp. 54–62.

PCT International Search Report Corresponding to International Application No. PCT/US99/22787; Authorized Officer: Herreman, G.; Date of Mailing: Mar. 6, 2000 (4 pages).

* cited by examiner

EVALUATING COMPUTER RESOURCES

CROSS-REFERENCE TO RELATED APPLICATIONS

This application claims the benefit of United States Provisional Application Ser. No. 60/102,579 entitled "MANAGING COMPUTER NETWORK RESOURCES" filed on Sep. 30, 1998, which is incorporated herein.

BACKGROUND

The present invention relates to a method and apparatus for evaluating computer resources.

To efficiently manage and troubleshoot computer resources such as software applications on a network, an administrator needs information about the status of the computer resources and communication paths on the network. To effectively monitor the resources and the network, the administrator needs information regarding the availability and performance of networked applications and the ability of the network to provide access to the networked applications. Such detailed information is important for management of the computer resources and the network so that the configuration of the resources or the network can be modified or supplemented as needed. Preferably, these modifications or supplements are put in place before major problems occur.

Currently, the information that is available about a software application running on a server may be derived from information that is accessible to the server or the application, and the information that is available about a network may be derived from information gathered by a network analyzing product such as a network sniffer, which is a device that is inserted into a segment of the network to monitor the packets that are traveling along the communication line into which the sniffer has been inserted.

The increasing popularity and complexity of Web site and networked database applications that are dependent on the Internet, or on a network using Internet protocols, has further complicated the administrative task, including the task of managing Web site database content and maintaining Web site effectiveness. Company Webmasters and business managers are routinely faced with a wide array of burdensome issues such as the detection, identification, and repair of broken Web sites and links, the monitoring and organization of large volumes of diverse, continuously-changing Web site and networked database content, and the detection and management of Web site problems and congested links. These issues are particularly significant for companies that rely on their Web sites to provide mission-critical information and services to customers and business partners.

SUMMARY OF THE INVENTION

A method and apparatus are provided for evaluating computer resources. To closely simulate the experience of an end user, a software agent executes in a location where the end user would be situated and attempts to exercise a computer resource such as a networked application or a network resource in a simulated transaction in exactly or nearly exactly the same way that the computer resource would be exercised by the end user in a non-simulated transaction. The results of the simulated transaction and of other simulated transactions by other software agents are communicated to a central software system for recordation and analysis.

The method and apparatus may be used with the World-Wide Web or the Internet or with a local area network ("LAN") or a wide area network ("WAN") that extends over a large enterprise and includes a number of LANs connected together in an "intranet."

Different aspects of the invention allow one or more of the following. An end-to-end evaluation can be performed of the ability of an overall system, that includes an application running on a server and a network providing access to the application, to serve an end-user effectively. A pro-active detection system can be provided that detects a problem in the overall system before the problem affects, or is detected by, an end-user. Simulated transactions that are highly representative of non-simulated transactions can be executed using the same computer resources that are used by the non-simulated transactions. Existing computer and network hardware already installed in a network can be used highly effectively to evaluate computer resources on the network. Evaluations of computer resources on a network can be performed at effectively any time with little or no disruption to the normal operation of the computer resources or the network.

Other features and advantages will become apparent from the following description, including the drawings, and from the claims.

BRIEF DESCRIPTION OF THE DRAWINGS

FIGS. 3A–6 are flow diagrams of computer-based procedures.

DETAILED DESCRIPTION

A Synthetic Transactions system that simulates the actions of an actual distributed network software application may be used to evaluate computer resource (e.g., application) response time or availability over a computer network. In at least some cases, the evaluations are taken from the perspective of an end user (which may be a human being or a software program), so that the evaluations reflect the application response time and availability that would likely be experienced by the end user.

As described in detail below, a Synthetic Transaction is a simulated application transaction. In at least some cases, it is advantageous if the simulated transaction is generated by an intelligent agent software system to evaluate a computer resource. For example, in a typical case concerning client/server technology on a network, a Synthetic Transactions software agent emulates a client side of a client/server transaction so that what happens on the network and on a server is the same, or nearly the same, as what would happen if the transaction were initiated by an actual end user on the client side. The agent may execute at a point on the network that is highly representative of where an actual end user would be situated, so that the path of associated communication across the network closely simulates the path of communication that is, or likely would be, associated with an actual end user.

Figure 1:
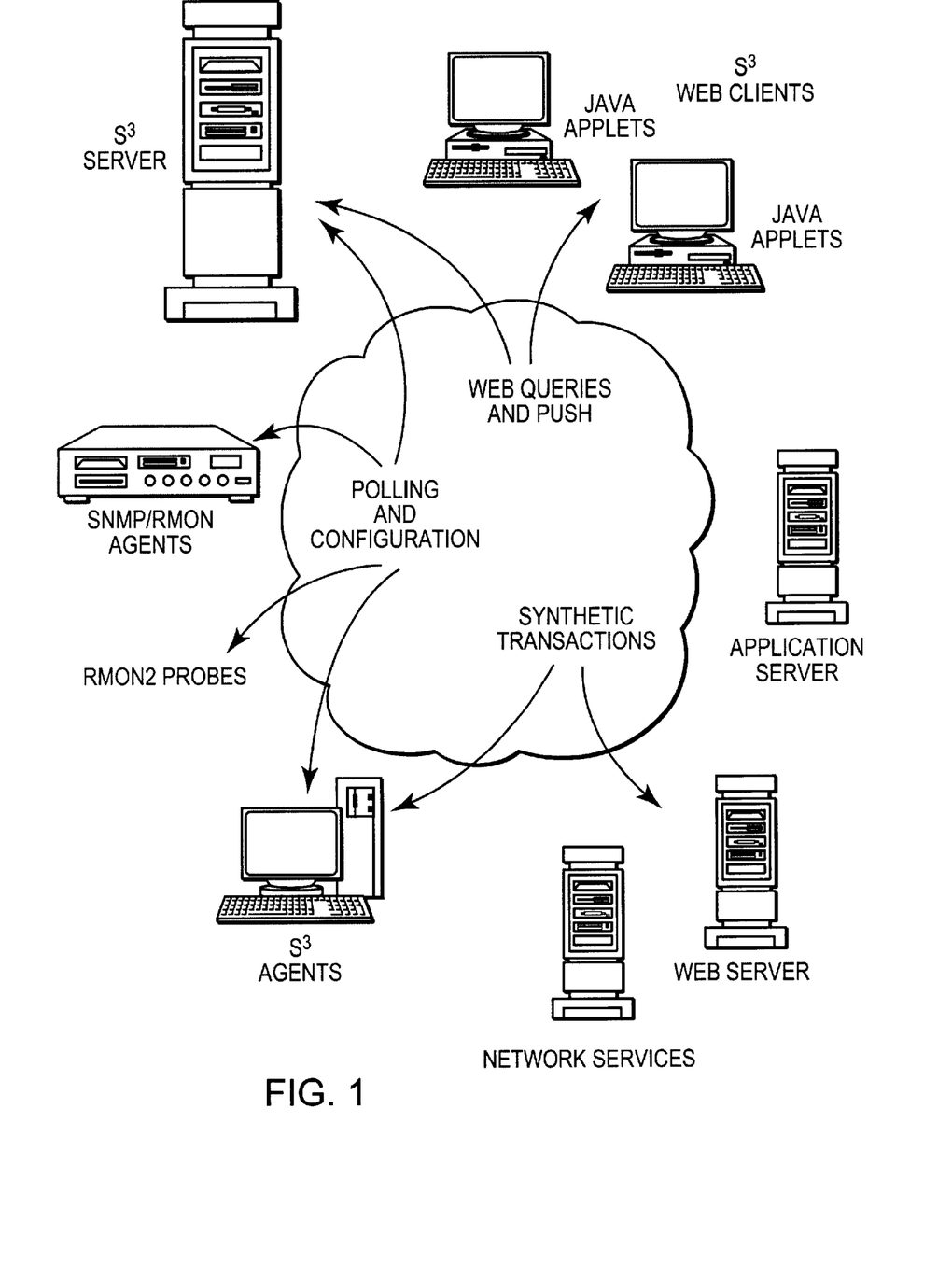
FIGS. 1–2 and 7 are block diagrams of computer-based systems.

FIG. 1 illustrates relationships among components of an example implementation ("NextPoint S3") of the Synthetic Transactions system, described in more detail below.

In the Synthetic Transactions system, an application response time is an amount of time between two events in the course of a transaction. Typically, the application response time is an amount of time between a time when a transaction involving an application is started by the software agent and a later time when the transaction is completed (e.g., when the last protocol message has been processed). However, intermediate points in the course of the transaction could be used where appropriate. Typically, the application response time includes any time spent in the transaction due to latencies in the computer network, the application server, any additional backend servers such as a database server, as well as time spent by the software agent (e.g., in processing application protocol messages).

An overall application response time measured by a software agent may include multiple components, such as time spent on the network and time spent in the application, which may also include multiple components such as time spent for individual queries in a database application.

One or more of many methods could be used in determining how much of an overall application response time is attributable to network travel time ("network response time") and to time spent in processing by the application ("processing response time"), respectively. In a first example method, an Internet Control Message Protocol Packet Internet Groper ("ICMP Ping") protocol transmission is used to determine the network response time. An ICMP Ping protocol transaction transmission is sent simultaneously, or nearly simultaneously, with an application protocol message to the application server. At the application server, the ICMP Ping protocol transaction transmission is processed at a low level without involving the application software, to issue a response. The amount of time that passes between the sending of the ICMP Ping protocol transmission and the receiving of the response represents the network response time. The processing response time may be determined by subtracting the network response time from the overall application response time.

In a second example method, a Transmission Control Protocol/Internet Protocol ("TCP/IP") socket connection time is determined and used to determine the network response time. An initial step in executing any TCP/IP network application transaction is the establishment of a TCP/IP socket connection between the client and the server, which establishment is used in the second method to measure the network response time. The establishment of the socket connection does involve the application on the server, because the connection is not successful unless the application accepts the connection, but such involvement does not include hard disk access or back end server components and therefore takes up relatively insignificant time. The network response time is taken to be the TCP/IP socket connection time (i.e., the amount of time needed to establish the socket connection) and the processing response time is determined by subtracting the network response time from the overall application response time.

An advantage of the second example method is that the measurement is made using the same network path that is used in typical non-evaluative transactions between the client and the server. In the case of the first example method, an ICMP Ping transmission may be filtered out by an intermediate network processor such as a firewall, or a network device providing Quality of Service ("QOS") services in place within the computer network may cause the ICMP Ping transmission to be given a priority that is different from the priority that a typical non-evaluative transmission would be given. Such a difference in priority may affect the network path followed or the processing time for the ICMP Ping transaction at the server, which would skew the evaluation of the network response time.

In a specific implementation, multiple methods, such as both the first and second example methods described above, may be made available for selection and execution.

Application availability is determined based on whether the application responds to a Synthetic Transactions transmission, regardless of the response time. If a response to the Synthetic Transactions transmission is received before a designated expiration time has passed, the application is noted as available. Otherwise, the application is noted as unavailable.

Synthetic Transactions may be executed on a scheduled basis such as a periodic basis, or on user demand. For example, a Synthetic Transaction may repeatedly exercise a specific application function, such as reading a customer record from a database. As a result, a baseline of expectations for the latency of the transaction being simulated may be established, and deviations from the baseline may be interpreted as indicating abnormal functioning of the computer network or the application. In cases in which the network response time and the processing response time are determined separately and corresponding separate baselines are established, the abnormal functioning may be isolated to the network or the application, respectively. See the commonly assigned, simultaneously filed United States Patent Application entitled "MANAGING COMPUTER RESOURCES".

Synthetic Transactions may be executed for at least the following network application technologies: ICMP Ping, Dynamic Host Control Protocol ("DHCP"), Domain Name Service ("DNS"), Post Office Protocol 3 ("POP3"), Simple Mail Transfer Protocol ("SMTP"), Standard Query Language ("SQL") Database queries, Hypertext Transport Protocol ("HTTP") web applications, eCommerce, SAP/R3, PeopleSoft, Lotus Notes, Microsoft Exchange and Voice over IP. Synthetic Transactions are not limited to Internet Protocol network applications and may be used for Systems Network Architecture ("SNA"), Internet Protocol Exchange ("IPX"), or Appletalk network applications, for example. All or a part of a network application may be evaluated through the use of Synthetic Transactions. In a typical implementation, a set of Synthetic Transactions is developed to evaluate common and important operations performed by the application. The user may be required to supply parameters that specify a particular instance of the application to be used. For example, the parameters may include the name of a server and a username and password to log into an application on the server.

In at least some cases, it may be advantageous if each set of Synthetic Transactions for an application has characteristics that are particularly appropriate for that application. Although the software agent may provide a common infrastructure for all transactions, the transactions for evaluations of a particular application may be tied to that application. For example, SQL scripts are supported by Synthetic Transactions for database queries. The SQL scripts allow for effectively infinite flexibility in the number and type of database related Synthetic Transactions that may be executed. In another example, a Synthetic Transaction to evaluate an ability to look up an Internet Domain Name by the Domain Name Service may have characteristics that render the transaction significantly less useful for another type of evaluation.

In at least some cases, the software agent generates a Synthetic Transaction by creating a set of network protocol messages that are appropriate for an application that is being evaluated. For example, as described in more detail below, to measure response time concerning a Web application, the software agent may build and generate HTTP protocol messages, to emulate a Web browser function. In such a case, a specific Uniform Resource Locator ("URL") identifier for a Web page is encoded in one or more of the HTTP protocol messages and the software agent attempts to retrieve all or a portion of the Web page specified by the URL identifier.

Information generated from a Synthetic Transaction may be temporarily stored by the software agent and may be subsequently sent to a central server for long term storage and for further processing and analysis. The software agent may be controlled by software at the central server, for a purpose such as so that the software agent is specifically directed to generate information needed by the central server for analysis of the network or computer resources. For example, software at the central server may determine a set of Synthetic Transactions to be executed and the schedule for the execution of such transactions, and then may apply the set and the schedule to the software agent, which may then execute autonomously to generate the information needed by the software at the central server. (In certain implementations, the software agent may be able to create, specify, or vary the set or the schedule, perhaps in response to varying conditions or inputs.)

Synthetic Transactions may be used to measure throughput, e.g., by keeping track of how much time is required for an amount of data to pass through a particular point in the network.

Figure 2:
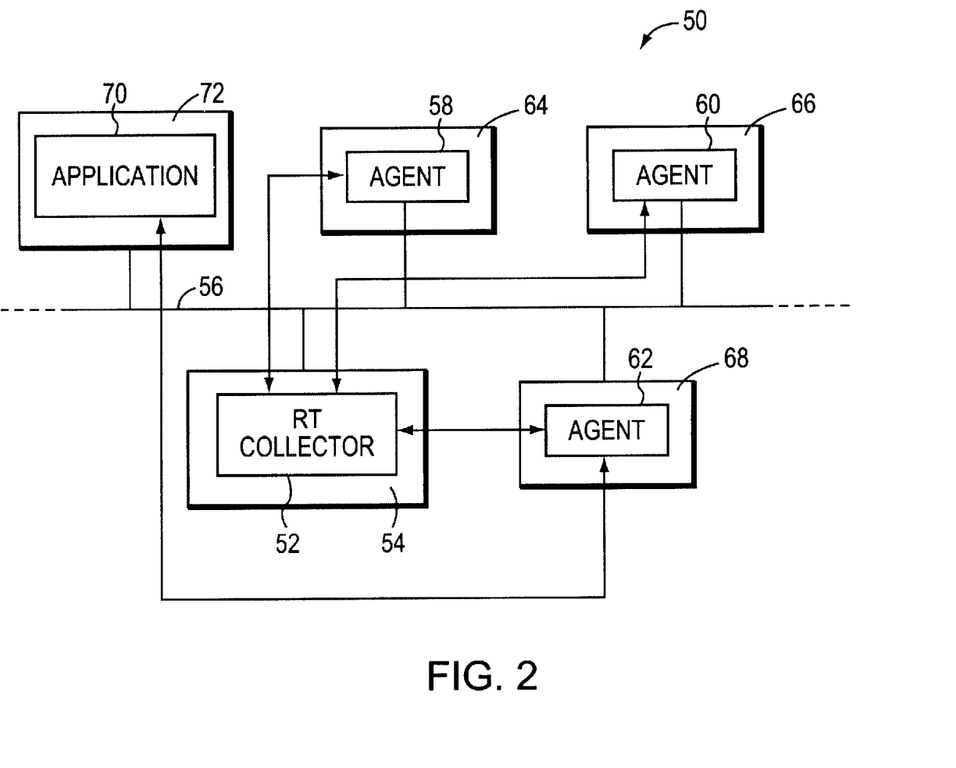

A specific example of a Synthetic Transaction is described below. FIG. 2 illustrates a network system 50 in which server software ("RT Collector") 52 running on a computer 54 communicates on a network 56 with software agents 58, 60, 62 ("Agents") running on other computers 64, 66, 68. The RT Collector and Agents execute as described below to conduct transactions in connection with evaluating a networked application 70 running on a Web site 72.

The RT Collector is initialized (FIGS. 3A–3B) (step 1010), and sets up a timer for the transactions that the RT Collector is to direct the Agents to execute (step 1020). The timer is set to issue a signal at periodic intervals (which may be user defined) when transactions are to be executed.

Figure 3A:
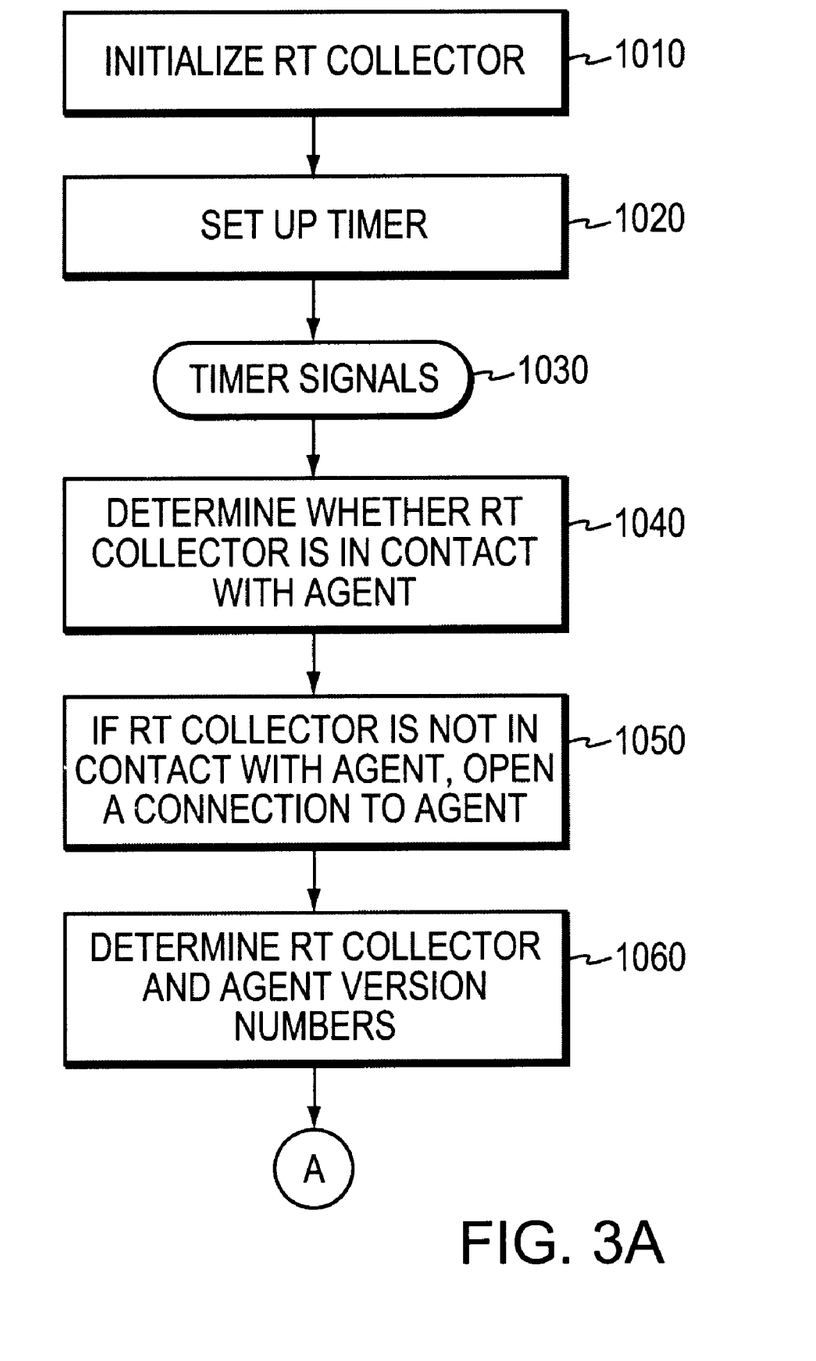
Figure 3B:
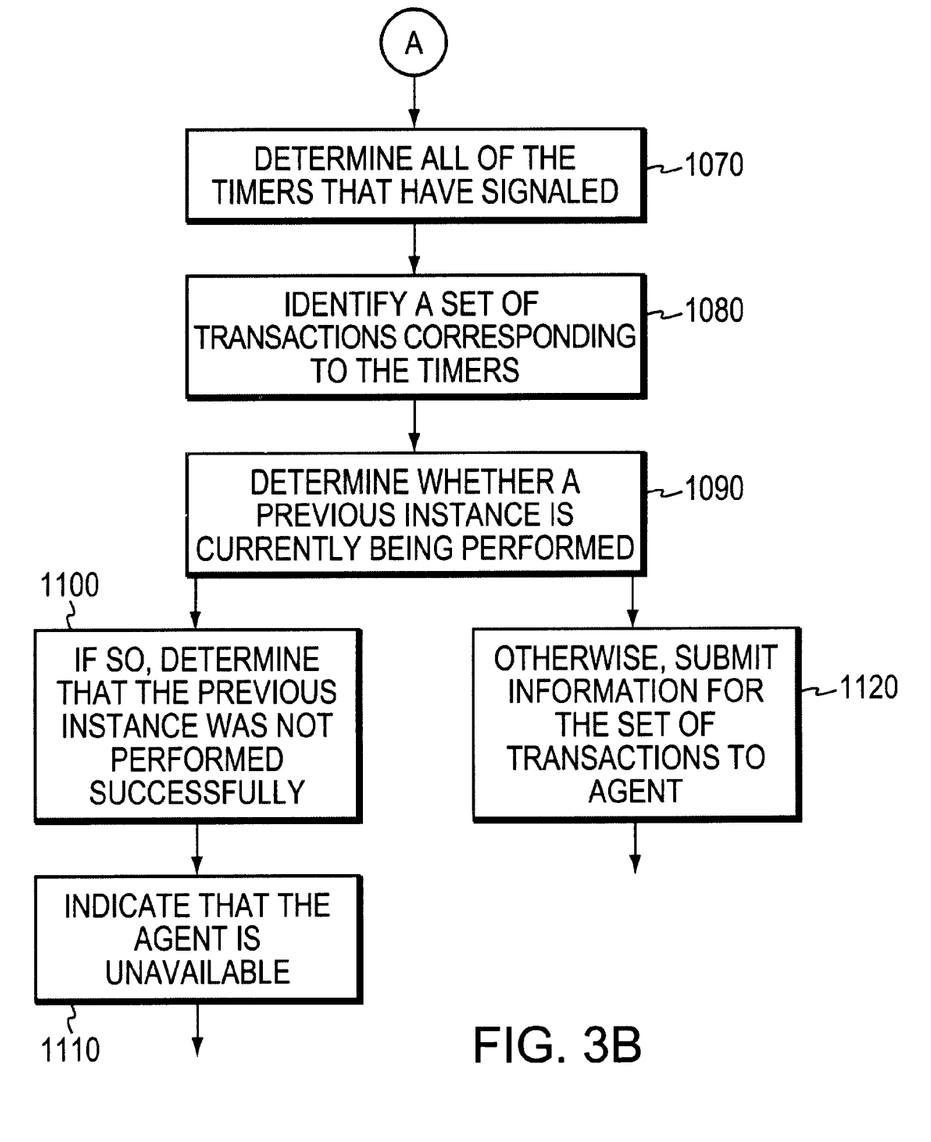

When the timer signals (step 1030), the RT Collector determines whether the RT Collector is currently in contact with the Agent that is responsible for performing a particular transaction (step 1040). If the RT Collector is not in contact with the Agent, the RT Collector opens a TCP socket connection to the Agent on a specified port such as port 9000 (step 1050). (If the RT Collector is unable to establish or reestablish a connection to the Agent, the RT Collector tries to establish the connection every time that the timer signals that the Agent is to perform a transaction.) Once established, the connection between the Agent and the RT Collector is used for all communications between the RT Collector and the Agent until the connection is lost, which may occur due to a network failure or when the client or the server closes the connection.

The RT Collector and the Agent determine each other's version numbers as follows (step 1060), so that the RT Collector and the Agent are aware of each other's capabilities. The RT Collector submits, to the Agent, a version request packet that indicates the version number of the RT Collector, and waits a fixed amount of time for the Agent to return another version packet that indicates the version number of the Agent. If the other version packet is not received before the fixed amount of time passes, the RT Collector assumes that the Agent has a version number, e.g., "1.0.0.0.0.", that corresponds to a basic set of capabilities.

After the version numbers are determined, the RT Collector determines all of the timers that have signaled (step 1070) and identifies a set of transactions corresponding to the timers (step 1080). The RT Collector determines whether a previous instance of any transaction in the set is currently being performed by the Agent (step 1090). If so, the RT Collector determines that the previous instance was not performed successfully (which may occur for a reason such as a malfunction in the Agent) (step 1100) and generates an exception indicating that the Agent is unavailable (step 1110). Otherwise, the RT Collector submits information for the set of transactions to the Agent (step 1120).

The information for the set of transactions to be performed is sent to the Agent in the form of packets. Each packet has a common header that includes the following information. A transaction ID is included that is to be returned to the RT Collector in response packets from the Agent so that the RT Collector can identify the transaction with which the response is associated. A transaction type ID is included to identify the type of transaction that the Agent is to perform (e.g., Web site transaction, e-commerce transaction, database query transaction). An integer is included to indicate the number of times that the transaction is to be performed.

The remainder of each packet is specific to the transaction type. For example, in the case of a Web site transaction, the remainder may include the URL of a Web page at the Web site and an integer indicating the number of lines to read from the Web page.

Each response packet sent from the Agent to the RT Collector includes a transaction ID, which in a specific implementation is the first piece of data in the response packet. The remainder of the response packet may be specific to the transaction type, and may include a response time value indicating a number of milliseconds of response time. A negative response time value may be used to indicate that an error occurred during performance of the transaction, and may include an error code bit mask that specifies the nature of the error to the RT Collector.

Figure 4A:
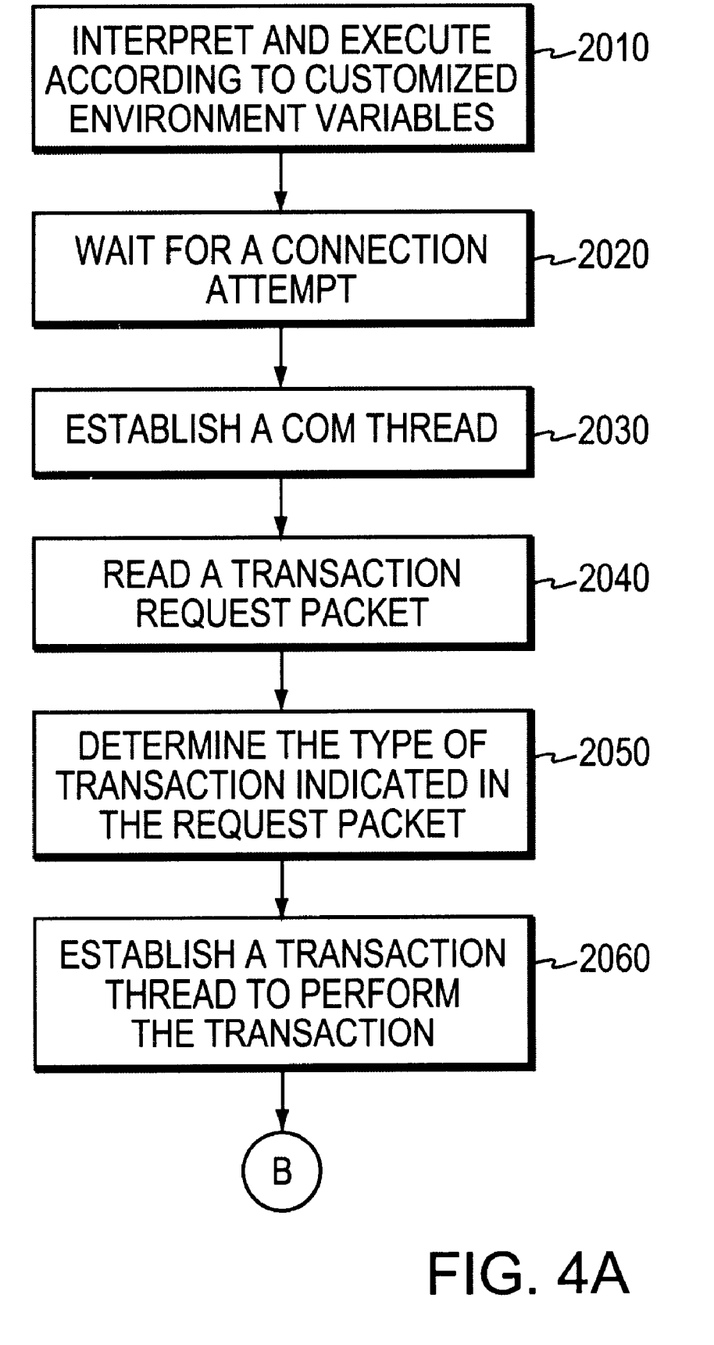
Figure 4B:
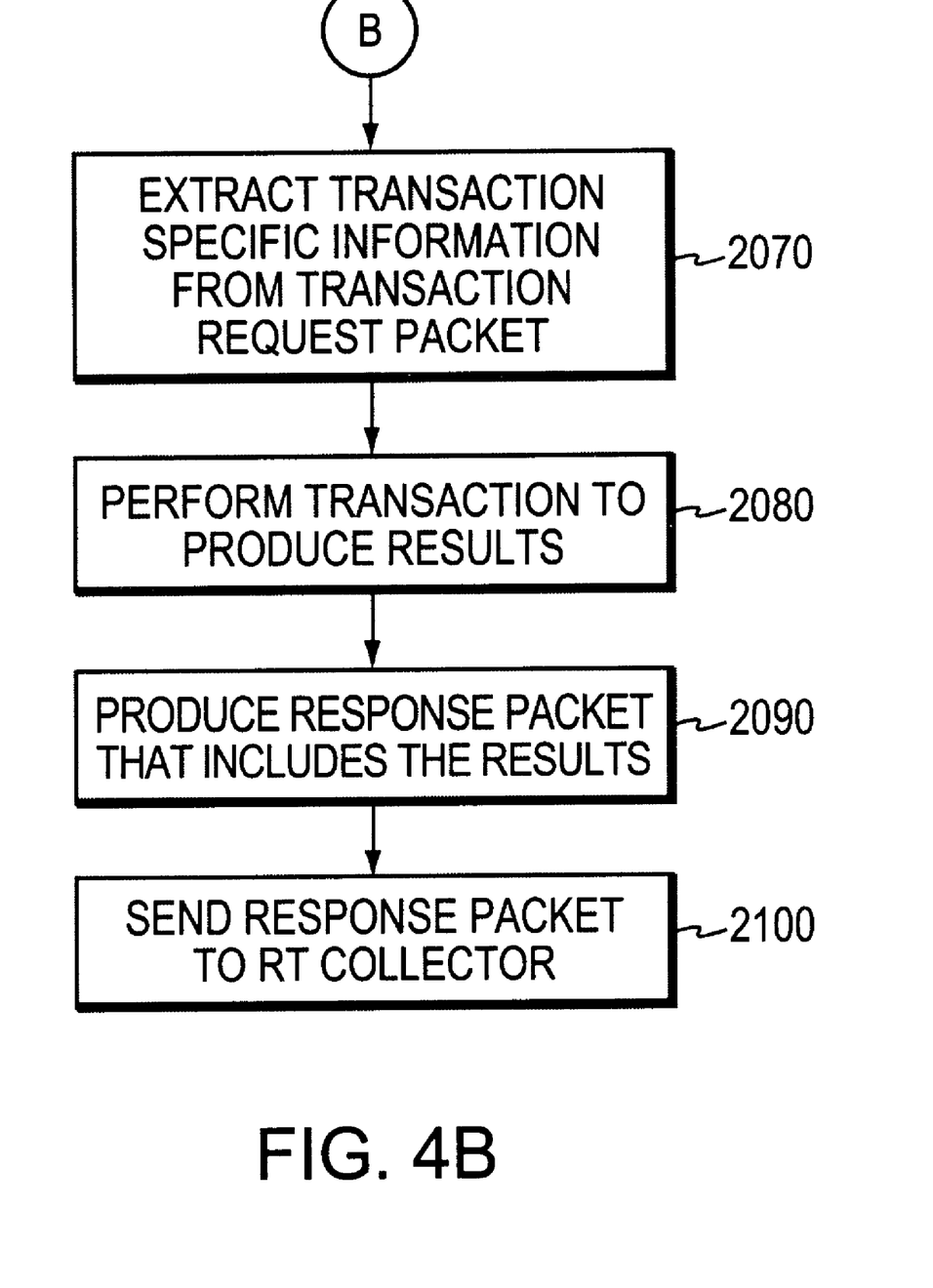
Figure 5A:
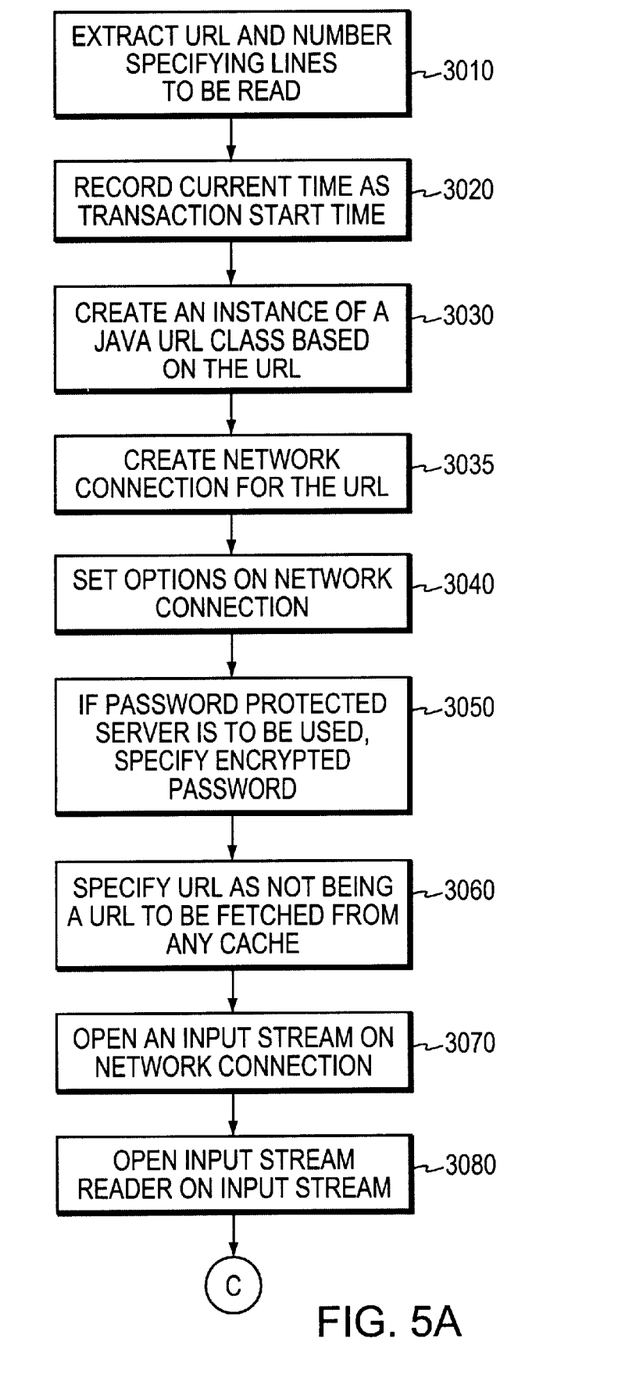
Figure 5B:
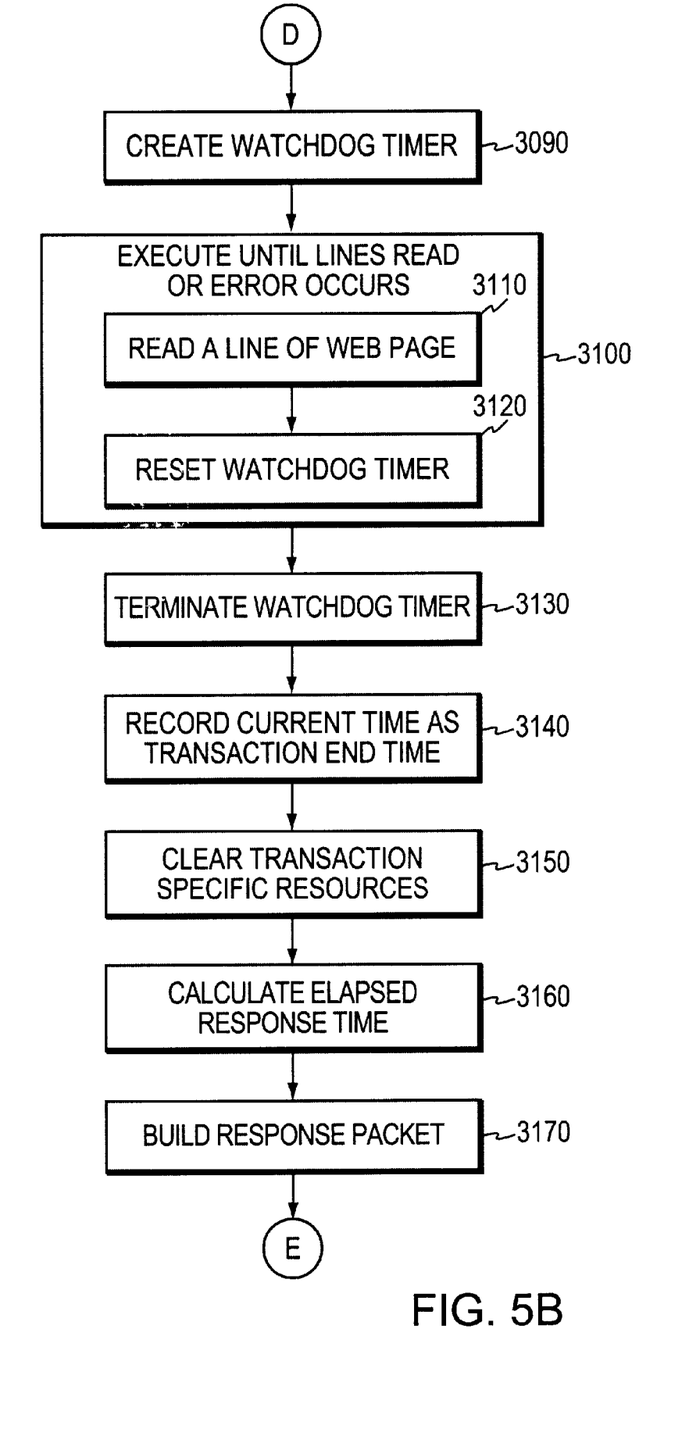
Figure 5C:
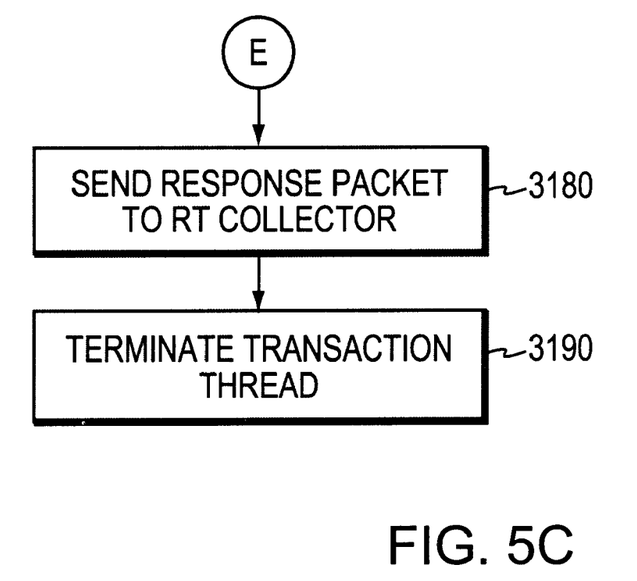
Figure 5D:
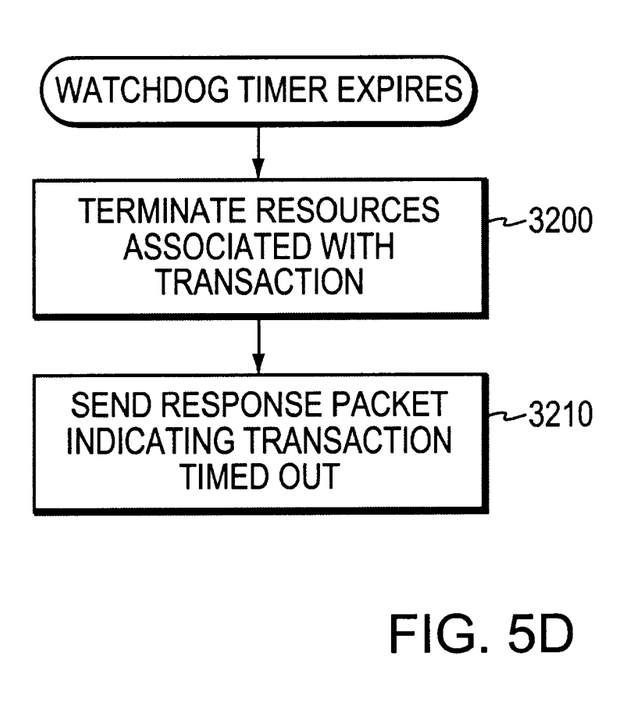

The Agent executes as follows (FIGS. 4A–4B). The Agent interprets, and executes according to, any customized environment variables that may have been specified, such as variables included on a command line command or in a parameter file maintained on a hosting computer system on which the Agent executes (step 2010).

The Agent waits for a connection attempt on port 9000 (step 2020). When an RT Collector connects, a "Com Thread" thread of execution is established to handle communication between the Agent and the RT Collector (step 2030) and the Agent waits for another connection attempt on port 9000.

The Com Thread executes in a loop that includes reading a transaction request packet received from the RT Collector (step 2040), determining the type of transaction that is indicated in the request packet (step 2050), and establishing a Transaction Thread to perform the transaction (step 2060). The Transaction Thread receives, as parameters, a reference to the transaction request packet and a reference to the socket connection, which allows the Transaction Thread to respond directly to the RT Collector independently of other Agent behavior.

In a specific implementation, the Transaction Thread executes as follows. Transaction-specific information is extracted from the transaction request packet (step 2070), and the transaction is performed to produce results (step 2080). A response packet is produced that includes the results (step 2090), and the response packet is sent to the RT Collector (step 2100).

A Web site transaction may be performed as follows (FIGS. 5A–5D), in a specific implementation. The URL of a Web site page to be read and a number specifying the number of lines of the page to be read are extracted from the transaction request packet (step 3010). The current time is recorded as a transaction start time (step 3020). An instance of a Java URL class is created based on the URL (step 3030). A network connection is created for the URL (step 3035), and options are set on the network connection, such an option concerning a selectable address or a customization in connection with the computing environment (step 3040). If the user has requested that a password protected HTTP proxy server be used, the encrypted password is specified (step 3050). The URL is designated to be for a Web page that is not to be fetched from any cache (step 3060).

An input stream is opened on the network connection (step 3070), and an input stream reader is opened on the input stream (step 3080). A watchdog timer is created that causes the evaluation to be halted if an expected response to any read request is not received within a specified amount of time, such as 30 seconds (step 3090).

The following steps 3110, 3120 are performed until the specified number of lines of the Web page are read, an error occurs, or all of the lines of the Web page have been read (step 3100). A line of the Web page is read (step 3110). To prevent the watchdog timer from expiring, the watchdog timer is reset (step 3120).

Once the specified number of lines have been read, the watchdog timer is terminated (step 3130). The current time is recorded as a transaction end time (step 3140). All transaction specific resources are cleared (step 3150).

An elapsed response time is calculated by determining the difference between the transaction end time and the transaction start time (step 3160). A response packet is built that includes the transaction ID that was passed in the request packet and either the elapsed response time or an error code as described above (step 3170). The response packet is sent to the RT Collector (step 3180) and the Transaction Thread is terminated (step 3190).

If the watchdog timer expires, the resources associated with the transaction are terminated (step 3200) and the RT Collector is sent a response packet indicating that the transaction timed out (step 3210).

Figure 6:
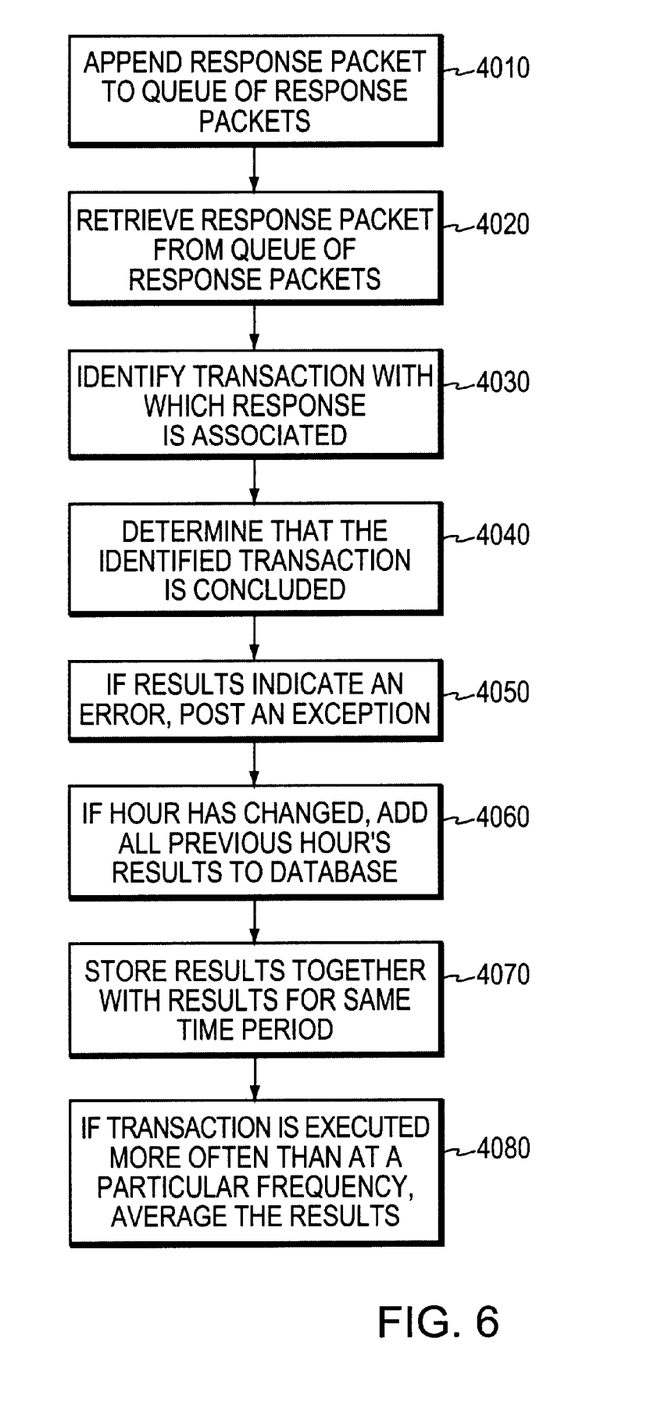

The RT Collector executes as follows upon receiving a response packet from the Agent (FIG. 6). The response packet is appended to a queue of response packets that is configured to hold the response packets of all of the Agents to which the RT Collector submits transaction requests (step 4010). In turn, the response packet is retrieved from the queue of response packets (step 4020). The transaction with which the response is associated is identified (step 4030) and is determined to be concluded (step 4040). If the results of the transaction indicate an error, an exception is posted (step 4050).

If the hour of the day (or other appropriate interval) has changed, the results of all of the previous hour's instances of the transaction are added to the database (step 4060).

The results of the transaction are stored together with results for other instances of the transaction in the same time period, such as in the current hour (step 4070). If the transaction is executed more often than a particular frequency, such as every 15 minutes, the corresponding results may be averaged (step 4080).

The technique (i.e., the procedures described above) may be implemented in hardware or software, or a combination of both. In at least some cases, it is advantageous if the technique is implemented in computer programs executing on one or more programmable computers, such as a personal computer running or able to run Microsoft Windows 95, 98, or NT, Sun Solaris, LINUX, Unix, or MacIntosh OS, that each include a processor, a storage medium readable by the processor (including volatile and non-volatile memory and/or storage elements), at least one input device such as a keyboard, and at least one output device. Program code is applied to data entered using the input device to perform the method described above and to generate output information. The output information is applied to one or more output devices such as a display screen of the computer.

In at least some cases, it is advantageous if each program is implemented in a high level procedural or object-oriented programming language such as C++ or Java to communicate with a computer system. However, the programs can be implemented in assembly or machine language, if desired. In any case, the language may be a compiled or interpreted language.

In at least some cases, it is advantageous if each such computer program is stored on a storage medium or device, such as ROM or magnetic diskette, that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims. For example, transactions may also be performed for e-commerce applications or database queries or for evaluations of network throughput or mass storage performance. In the case of database queries, a database transaction system can be arranged in which SQL statements are submitted by a software agent to a remote database server on a periodic basis such as every five minutes.

Figure 7:
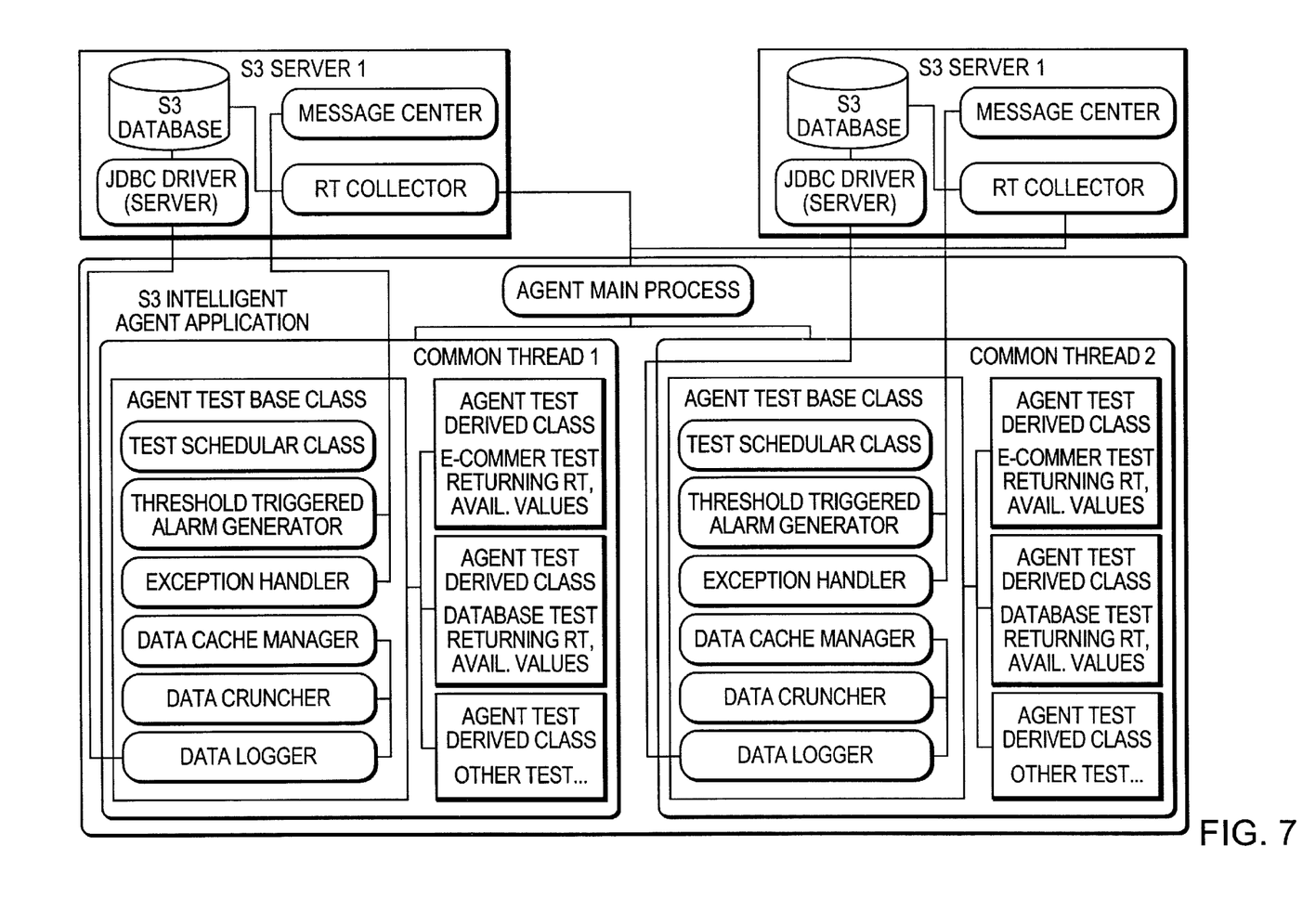

The software agent may execute tasks such as breaking down the test results into components including the connection time, and automatically executing a transaction multiple times at predetermined intervals in response to a single directive from the RT Collector. Execution threads may be arranged so that multiple RT Collectors may be served by a single software agent, and a single RT Collector may be served by multiple software agents. The software agent may acknowledge receipt of a request packet from the RT Collector by sending an acknowledgement packet to the RT Collector. The software agent may have a class structure, such as the structure illustrated in FIG. 7, within which processing tasks are delegated. The class structure may include a facility for processing the results of a transaction, and perhaps also a facility that generates an alarm, an alert, or an exception when the processing indicates that the results merit drawing attention to a computer resource involved in the transaction.

Transactions may be grouped by transaction IDs. Java based classes of distributed processes may be used, which may provide significant platform independence.

The software agent may maintain a data storage cache in which to store the results of multiple transactions, which may reduce the amount or frequency of communication between the software agent and the RT Collector and may allow the software agent to operate autonomously during a period in which the RT Collector cannot communicate with the software agent. If the cache becomes full or nearly full, information in the cache may be discarded on a first in, first out basis.

The RT Collector may serve as a socket client. Java archive objects, SNMP Management Information Base ("MIB"), Extensible Markup Language ("XML") page description technology, or Push technology may be used, and may allow the software agent to supply results to the RT Collector or to another destination on a Push technology basis.

The transaction specific information supplied by the RT Collector may be derived from information that the RT Collector extracts from a database of evaluation transaction setup information.

What is claimed is:

1. A method comprising:
   causing, from a central location, multiple emulation transactions to be executed that each emulates an end-user's interaction with a software application, wherein each transaction includes communication with the software application across a network, and wherein at least two of the multiple emulation transactions originate from two different respective locations on the network; and
   storing information derived from a result of at least one of the transactions at the respective originating location for later transmission to the central location.

2. The method of claim 1, further comprising:
   causing a message to be transmitted, to a point where the software application is executing, from an end-user point on the network.

3. The method of claim 1, further comprising:
   causing a message to be transmitted, from a point where the software application is executing, to an end-user point on the network.

4. The method of claim 1, wherein the software application includes a Web server application.

5. The method of claim 4, wherein:
   causing the transaction to be executed includes emulating a function of a Web browser.

6. The method of claim 1, wherein the network includes client/server technology and the transaction includes a client/server transaction.

7. The method of claim 6, further comprising:
   emulating the client side of the client/server transaction.

8. The method of claim 1, further comprising:
   attempting to retrieve specified information from the software application.

9. The method of claim 1, further comprising:
   attempting to retrieve information from a Web page supplied by the software application.

10. The method of claim 1, further comprising:
    supplying login information to the software application.

11. The method of claim 1, wherein the software application includes a database application.

12. The method of claim 11, further comprising:
    attempting to retrieve information from the database application.

13. The method of claim 1, further comprising:
    determining a response time in at least one of the multiple emulation transaction.

14. The method of claim 13, further comprising:
    determining an application processing time component of the response time.

15. The method of claim 13, further comprising:
    determining a network processing time component of the response time.

16. The method of claim 1, further comprising:
    attempting to establish a TCP/IP connection; and
    based on a result of the attempt, determining a network processing time.

17. The method of claim 1, further comprising:
    transmitting a ping message; and
    based on a result of the transmission, determining a network processing time.

18. The method of claim 1, wherein the emulating includes emulating a TCP/IP client.

19. The method of claim 1, further comprising:
    based on at least one of the multiple emulation transactions, determining the availability of the software application.

20. The method of claim 19, further comprising:
    if a response is not received timely from the software application, determining that the software application is unavailable.

21. The method of claim 1, further comprising:
    causing multiple instances of at least one of the multiple emulation transactions to be executed according to a schedule.

22. The method of claim 21, further comprising:
    deriving a performance baseline from results of the multiple instances.

23. The method of claim 1, further comprising:
    transmitting a data packet to the software application, the data packet including information that identifies at least one of the multiple emulation transactions.

24. The method of claim 1, wherein the point in the computer network includes an end-user point.

25. A method comprising:
    issuing, from a central source, a directive to generate a simulated computer communication;
    generating the simulated computer communication at a point in a computer network;
    using a non-simulated network resource to deliver the simulated computer communication to a computer resource;
    evaluating the computer resource based on a result of the delivery of the simulated computer communication to the computer resource; and
    receiving, at the central source, a report on the result of the delivery of the simulated computer communication to the computer resource.

26. Computer software, residing on a computer-readable storage medium, comprising a set of instructions for use in a computer system to cause the computer system to:
    cause, from a central location, multiple emulation transactions to be executed that each emulates an end-user's interaction with a software application, wherein each transaction includes communication with the software application across a net-work, and wherein at least two of the multiple emulation transactions originate from two different respective locations on the network; and
    store information derived from a result of at least one of the transactions at the respective originating location for later transmission to the central location.

27. Computer software, residing on a computer-readable storage medium, comprising a set of instructions for use in a computer system to cause the computer system to:
    issue, from a central source, a directive to generate a simulated computer communication;
    generate the simulated computer communication at a point in a computer network;
    use a non-simulated network resource to deliver the simulated computer communication to a computer resource;

evaluate the computer resource based on a result of the delivery of the simulated computer communication to the computer resource; and receive, at the central source, a report on the result of the delivery of the simulated computer communication to the computer resource.

28. A system comprising:

a system that causes, from a central location, multiple emulation transactions to be executed that each emulates an end-user's interaction with a software application wherein each transaction includes communication with the software application across a network, and wherein at least two of the multiple emulation transactions originate from two different respective locations on the network; and stores information derived from a result of at least one of the transactions at the respective originating location for later transmission to the central location.

29. A system comprising:

a generator that generates a simulated computer communication at a point in a computer network;

a utilizer that uses a non-simulated network resource to deliver the simulated computer communication to a computer resource;

an evaluator that evaluates the computer resource based on a result of the delivery of the simulated computer communication to the computer resource a transmitter that issues, from a central source, a directive to generate the simulated computer communication; and a receiver that receives, at the central source, a report on the result of the delivery of the simulated computer communication to the computer resource.

30. The computer software of claim 26, wherein the software application includes a Web server application.

31. The computer software of claim 26, wherein the network includes client/server technology and the transaction includes a client/server transaction.

32. The computer software of claim 26, wherein the software application includes a database application.

33. The computer software of claim 26, wherein the emulating includes emulating a TCP/IP client.

34. The computer software of claim 26, further comprising:

based on at least one of the multiple emulation transactions, determining the availability of the software application.

35. The system of claim 28, wherein the software application includes a Web server application.

36. The system of claim 28, wherein the network includes client/server technology and the transaction includes a client/server transaction.

37. The system of claim 28, wherein the software application includes a database application.

38. The system of claim 28, wherein the emulating includes emulating a TCP/IP client.

39. The system of claim 28, further comprising:

based on at least one of the multiple emulation transactions, determining the availability of the software application.

40. The method of claim 25, wherein the network includes client/server technology and the simulated computer communication includes a client/server transaction.

41. The method of claim 40, further comprising:

emulating the client side of the client/server transaction.

42. The method of claim 25, wherein the central source comprises a central server or a central software system.

43. The method of claim 25, wherein the computer resource comprises an application.

44. The computer software of claim 27, wherein the network includes client/server technology and the simulated computer communication includes a client/server transaction.

45. The computer software of claim 44, further comprising:

emulating the client side of the client/server transaction.

46. The computer software of claim 27, wherein the central source comprises a central server or a central software system.

47. The computer software of claim 27, wherein the computer resource comprises an application.

* * * * *

UNITED STATES PATENT AND TRADEMARK OFFICE
CERTIFICATE OF CORRECTION

PATENT NO.    : 6,519,714 B1  
DATED         : February 11, 2003  
INVENTOR(S)   : Sweet et al.

It is certified that error appears in the above-identified patent and that said Letters Patent is hereby corrected as shown below:

Column 10,
Line 29, please replace "of claim 1" with -- of claim 25 --.
Line 25, please replace "net-work" with -- network --.

Signed and Sealed this

Twenty-fifth Day of November, 2003

JAMES E. ROGAN
*Director of the United States Patent and Trademark Office*